US011912542B2

(12) United States Patent
Mietschnig et al.

(10) Patent No.: US 11,912,542 B2
(45) Date of Patent: Feb. 27, 2024

(54) LIFTING DEVICE HAVING AN APPARATUS FOR ASSISTING OR FOR FULLY AUTOMATICALLY CARRYING OUT AN ERECTION OR PLACING DOWN PROCEDURE OF A BOOM SYSTEM AND CORRESPONDING METHOD

(71) Applicant: Liebherr-Werk Nenzing GmbH, Nenzing (AT)

(72) Inventors: Walter Mietschnig, Brand (AT); Manfred Schapler, Vandans (AT); Tizian Lamprecht, Bludesch (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 9 days.

(21) Appl. No.: 17/655,269

(22) Filed: Mar. 17, 2022

(65) Prior Publication Data

US 2022/0297989 A1 Sep. 22, 2022

(30) Foreign Application Priority Data

Mar. 19, 2021 (DE) .................... 10 2021 106 745.6

(51) Int. Cl.
*B66C 23/82* (2006.01)
*B66C 13/46* (2006.01)
*B66C 23/68* (2006.01)

(52) U.S. Cl.
CPC .............. *B66C 23/82* (2013.01); *B66C 13/46* (2013.01); *B66C 23/68* (2013.01); *B66C 2700/0392* (2013.01)

(58) Field of Classification Search
CPC ....... B66C 23/82; B66C 23/68; B66C 23/905; B66C 23/42; B66C 23/34; B66C 23/342; B66C 2700/0392
See application file for complete search history.

(56) References Cited

U.S. PATENT DOCUMENTS 6,378,653 B1 * 4/2002 Takahashi ............ B66F 11/046 182/62.5
10,526,176 B2 * 1/2020 Kobatake ............... B66C 23/34
(Continued)

FOREIGN PATENT DOCUMENTS

DE 102011107754 A1 12/2012
DE 102016015388 A1 6/2018

*Primary Examiner* — Michael R Mansen
*Assistant Examiner* — Juan J Campos, Jr.
(74) *Attorney, Agent, or Firm* — McCoy Russell LLP

(57) ABSTRACT

The present disclosure relates to a lifting device, in particular a mobile crane or a cable-operated excavator, that comprises a superstructure, a main boom that starts from the superstructure, a luffing boom that starts from the end of the main boom remote from the superstructure, a winch arrangement, and a tilting moment detection unit for determining the tilting moment acting on the lifting device by the position of the main boom and the luffing boom. The disclosure is characterized by an apparatus for assisting or for fully automatic carrying out an erecting and/or placing down procedure of a boom system comprising the main boom and the luffing boom that is configured to carry out the steps for erecting and/or placing down the boom system in dependence on the tilting moment detected by the tilting moment detection unit.

21 Claims, 1 Drawing Sheet

(56) References Cited

U.S. PATENT DOCUMENTS

| | | | | |
|---|---|---|---|---|
| 2009/0127219 | A1* | 5/2009 | Willim | B66C 23/702<br>212/300 |
| 2012/0312767 | A1* | 12/2012 | Bohnacker | B66C 13/46<br>701/50 |
| 2017/0369287 | A1* | 12/2017 | Krupinski | B66C 23/905 |
| 2018/0179027 | A1* | 6/2018 | Bohnacker | B66C 13/06 |
| 2019/0390444 | A1* | 12/2019 | Misaki | E02F 9/265 |
| 2020/0131731 | A1* | 4/2020 | Wu | E02F 9/2041 |
| 2020/0277758 | A1* | 9/2020 | Edamura | E02F 9/262 |
| 2020/0307968 | A1* | 10/2020 | Hoshino | B66C 23/34 |

* cited by examiner

LIFTING DEVICE HAVING AN APPARATUS FOR ASSISTING OR FOR FULLY AUTOMATICALLY CARRYING OUT AN ERECTION OR PLACING DOWN PROCEDURE OF A BOOM SYSTEM AND CORRESPONDING METHOD

CROSS-REFERENCE TO RELATED APPLICATION

The present application claims priority to German Patent Application No. 10 2021 106 745.6 filed on Mar. 19, 2021. The entire contents of the above-listed application is hereby incorporated by reference for all purposes.

TECHNICAL FIELD

The present disclosure relates to a lifting device, in particular a mobile crane or a cable-operated excavator, having an apparatus for assisting or fully automatically carrying out an erection and/or placing down procedure of a boom system and to a corresponding method.

BACKGROUND

Mobile cranes or also cable-operated excavators are as a rule used with boom system in which an adjustable luffing boom is mounted on a main boom. The erection and placing down of such a boom system is relatively complex since the machine operator has to simultaneously control a plurality of winches for driving the different booms and additionally has to monitor various cable forces for a correct control.

SUMMARY

How a boom system is erected is known from the prior art. This can be understood, for example, with reference to FIGS. 1 to 3 and to the following explanations.

The boom system lies on the ground, as shown in FIG. 1. The total center of gravity of the boom system first has to be moved in the direction of the base unit with ground contact of the luffing boom head before the boom system can be lifted from the ground.

The main boom adjustment is controlled in the direction of lifting, with the luffing boom adjustment first simultaneously being controlled in the direction of lowering.

The boom system is thus moved into a switchblade position (FIG. 2) in which the total center of gravity of the boom system is on such a small working radius that the adjustable luffing boom can be lifted from the ground. This is done, for example, in that only the main boom is controlled in the direction of lifting until it has reached its steepest position for the erection procedure. The luffing boom is then pivoted with respect to the main boom in the direction of lifting until the boom system has reached a geometrical position for which as a rule a payload table for crane operation is available (cf. FIG. 3). The state of the lifting device shown in FIG. 3 corresponds to an erected boom system.

In this respect, it is typically the case in accordance with the prior art that the boom system is moved into predefined positions on an erection or a placing down, as is known from DE 10 2016 015 388.

The placing down of the boom system works in the same manner. The main boom is moved to the steepest position, with the luffing boom then being lowered until it either has ground contact or has reached its minimal angle with respect to the main boom. The main boom is then controlled in the direction of lowering. When the luffing boom head has ground contact, the luffing boom is simultaneously controlled in the direction of lifting to hold the holding cables of the luffing boom taut and to achieve a placing of the boom on the ground.

It is disadvantageous in the implementation known from the prior art for erecting or placing down a boom system that the latter has to be moved to predefined positions. On an erection prior to a pivoting of the luffing boom with respect to the main boom in the lifting direction, for example, the main boom thus first has to be traveled to its maximum lifted position It is not even possible for experienced operators of lifting devices to deviate from this procedure since any deviation is prohibited for safety reasons.

It is additionally necessary that the luffing boom simultaneously has to be traveled to the main boom, with the required controlling speed being very difficult to estimate by the machine operator. It depends on the holding cable preload of the luffing boom that can only be seen correctly from a remote lateral plan view of the boom system, which makes a signaler necessary who is in communication with the operator.

The parallel actuation of the control to pivot the main boom and the luffing boom is furthermore also very challenging so that the procedure to assemble or disassemble a lifting device is demanding and is susceptible to error despite the standardized worksteps that have to be strictly observed.

It is the aim of the present disclosure to overcome or at least to alleviate the disadvantages listed above, which is done by the lifting device.

In accordance with the disclosure, a lifting device is accordingly provided, in particular a mobile crane or a cable-operated excavator, that comprises a superstructure having a winch arrangement, a main boom that starts from the superstructure, a luffing boom that starts from the end of the main boom remote from the superstructure, and a tilting moment detection unit for determining the tilting moment acting on the lifting device by the position of the main boom and the luffing boom. The lifting device is characterized by an apparatus for assisting or for fully automatically carrying out an erection and/or placing down procedure and erection and/or placing down procedure of a boom system comprising the main boom and the luffing boom that is configured to carry out steps for erecting and/or placing down the boom system in dependence on the tilting moment detected by the tilting moment detection unit.

The winch arrangement that can, for example, be arranged at the superstructure, serves to pivot the main boom with respect to the superstructure and/or to pivot the luffing boom with respect to the main boom.

It is therefore thus no longer necessary that the individual elements of the boom system are traveled into specified, fixedly defined positions before a subsequent step for erection/placing down can be carried out. It had previously been necessary in accordance with the prior art that the main boom has to be traveled into a specified erected position and that the luffing boom is simultaneously moved with respect to the main boom in the lowering direction so that the connection section between the two boom elements has been traveled upwardly (into the so-called switchblade position). It was only allowed that the luffing boom is traveled into a lifting direction with respect to the main boom when the main boom is in its maximum erected position or in a fixedly specified erected position.

With respect to this rigid method since now it is no longer necessary to wait until, for example, the main boom is in its predetermined erected position so that the luffing boom can already be pivoted earlier with respect to the main boom. The exact time depends on the detected values of the tilting moment detection unit.

In accordance with the disclosure, the focus is now placed on the tilting moment that acts on the lifting device and a decision is made in dependence thereon when, for example, a movement of the luffing boom with respect to the main boom can be carried out during an erection procedure. This is typically already possible when the main boom has not yet reached its maximum erected position so that there is a simultaneous pivoting of the main boom with respect to the superstructure and the luffing boom with respect to the main boom since it is ensured on the basis of the detected tilting movement that there is no risk of the lifting equipment tilting.

There is an analog behavior on a placing down of the boom system from an erected state, according to which it had previously been necessary in accordance with the prior art that the main boom has to be moved into its maximum erected position at the start of a placing down procedure of the main boom and a pivoting of the luffing boom with respect to the main boom in the lowering direction can only be performed after reaching this position.

The disclosure here also allows an earlier movement of the luffing boom with respect to the main boom in the lowering direction with a corresponding taking into account of the tilting moment so that it can already be moved toward the main boom when the main boom has not yet reached its maximum erected position or a location to be adopted for carrying out the placing down procedure (required in accordance with the prior art). This accelerates the erection or placing down of the boom system at the lifting device and thus enables a more efficient use and an improved cost efficiency accompanying it.

Provision can furthermore be made in accordance with the disclosure that the apparatus for assisting or for fully automatically carrying out an erection and/or placing down procedure is furthermore configured only to carry out the steps for the erection and/or placing down of the boom system in dependence on the tilting moments detected by the tilting moment detection unit so that rigid boom positions do not have to be reached in the sequence of steps for the erection and/or placing down of the boom system.

In accordance with a variant of the disclosure, it is therefore possible to continue with the carrying out of the steps independently of a reaching of specific angle positions of the booms, with here only the tilting torque acting on the lifting device being considered and other parameters not being considered.

Provision can be made in accordance with a further optional modification of the present disclosure that the apparatus is furthermore configured for assisting or for fully automatically carrying out an erection and/or placing down procedure or is configured on the carrying out of the steps for the erection and placing down of the boom system:

a) to already control the luffing boom in the lifting direction on an erection procedure from the placed down ground position when the main boom has not yet reached its maximum erected position; and/or
b) to already control the luffing boom in the lowering direction on a placing down procedure from the erected working position when the main boom has not yet reached its maximum erected position, with
c) the controlling of the luffing boom in the lifting direction or in the lowering direction may also be able to take place in that the luffing boom is held in a fixed position with respect to the main boom and the movement of the luffing boom takes place by a lifting or lowering of the main boom.

Provision can furthermore be made in accordance with the disclosure that the apparatus for assisting or for fully automatically carrying out an erection and/or placing down procedure is furthermore configured:

a) to pivot the luffing boom with respect to the main boom in the lifting direction simultaneously with a lifting of the main boom on an erection procedure from the placed down ground position, such as for raising a luffing boom tip from the ground; and/or
b) to pivot the luffing boom with respect to the main boom in a lowering direction on a placing down procedure from the erected working position simultaneously with a lifting of the main boom; and/or
c) to pivot the luffing boom with respect to the main boom in a lowering direction on a placing down procedure simultaneously with a lowering of the main boom.

Provision can furthermore be made in accordance with a modification of the present disclosure that the apparatus for assisting of for fully automatically carrying out an erection and/or placing down procedure is furthermore configured to control a luffing boom winch to lower and raise the luffing boom during an erection and/or placing down procedure, in a state in which the luffing boom has ground contact, such that the holding cable to the luffing boom exceeds a predetermined first tension value to enable a correct winding up on the luffing boom winch.

It has previously been customary during an erection and placing down procedure of the prior art that the operator not only has to control the winch for controlling the main boom, but rather simultaneously thereto also has to control the winch to control the luffing boom to hold the holding cable of the luffing boom tensioned so that an error-free winding up on the associated winch can take place. However, care must be taken at the same time that the tension of the holding cable to the luffing boom is not too high since otherwise a tilting of the lifting device can occur.

Since it is now possible in accordance with the apparatus in accordance with the disclosure to maintain the holding cable tension without any manual intervention of an operator, the necessity of providing a signaler who provides the operator with information on the holding cable tension previously required in the prior art can be dispensed with. This produces a further simplification in the erection or placing down of the boom system of a lifting device.

Provision can furthermore be made that the apparatus for assisting of for fully automatically carrying out an erection and/or placing down procedure is configured to control a luffing boom winch to lower and raise the luffing boom during an erection and/or placing down procedure, in a state in which the luffing boom has ground contact, such that the holding cable to the luffing boom does not exceed a predetermined second tension value to prevent a tilting of the lifting device.

Since it is, however, ensured that the tension of the holding cable is in a predetermined range, it can be prevented that the tension of the holding cable produces a tilting of the lifting device. Provision can be made here that the tilting moment detection unit is likewise made use of to regulate the holding cable tension to discover whether a tilting of the lifting device is impending due to the applied tension of the holding cable.

Provision can accordingly be made that the predetermined first tension value is smaller than the predetermined second tension value.

Provision can be made in accordance with a further optional embodiment of the present disclosure that the steps for erecting the boom system from a position placed on the ground comprise a control of the main boom in the lifting direction and a simultaneous control of the luffing boom with respect to the main boom in the lowering direction so that a lifting of the connection region of the main boom and the luffing boom takes place (into the co-called switchblade position), with then, as soon as the tilting moment detected by the tilting moment detection unit is sufficiently low, a control of the luffing boom in the lifting direction may be carried out (by fixing with respect to the main boom or a pivoting away therefrom), for instance, already when the main boom has not yet reached its maximum erected position.

Provision can be made in accordance with a further development of the disclosure that steps for placing down the boom system from an erected position comprise a control of the luffing boom with respect to the main boom in the lowering direction, with, provided that the tilting moment detected by the tilting moment detection unit exceeds a threshold value, a control of the main boom in the lifting direction first taking place and, as soon as the control of the luffing boom with respect to the main boom in the lowering direction has the result that the luffing boom has passed through the horizontal, a control of the luffing boom with respect to the main boom in the lowering direction takes place simultaneously with a control of the main boom in the lowering direction, provided that the tilting moment detected by the tilting moment detection unit has not exceeded a threshold value, with the control of the luffing boom with respect to the main boom in the lowering direction may take place for so long until the luffing boom tip has ground contact or has pivoted inwardly by a maximum with respect to the main boom.

Provision can be made in this respect that, after a control of the luffing boom with respect to the main boom in the lowering direction for so long until the luffing boom tip has ground contact or has pivoted inwardly to a maximum with respect to the main boom, the steps for placing down the boom system from an erected position further comprise a control of the main boom in the lowering direction and a simultaneous control of the luffing boom with respect to the main boom in the lifting direction so that a lowering of the connection region of the main boom and the luffing boom takes place, with the control of the main boom in the lowering direction and the simultaneous control of the luffing boom with respect to the main boom in the lifting direction taking place for so long until the main boom has ground contact.

Provision can be made in accordance with a further optional modification of the disclosure that the lifting device is furthermore provided with a user interface for actuating the apparatus for assisting or fully automatically carrying out an erection and/or placing down procedure, wherein the user interface may have a lever whose deflection influences a speed of the steps to be carried out, with a non-deflection of the lever which may result in a stopping of the steps to be carried out.

It is useful here that the machine operator is in a position to be able to control the total boom system in the direction of erection and/or in the direction of placing down of the boom system with only one control lever. In addition, he can specify the movement speed of the boom system by the deflection of the lever here.

Alternatively to this, a different embodiment of the user interface can be provided, for example in the form of an actuation button or the like that provides, after an activation, that the erection or the placing down of the boom system runs fully automatically. It can thus be necessary that the button has to be kept depressed during the erection or the placing down so that a standstill occurs on the release of the button and any hazard situations recognized by the operator can be avoided.

Provision can furthermore be made that the main and luffing boom adjustment winches are controlled on the basis of these specifications of the user interface and/or of the apparatus for assisting or fully automatically carrying out an erection and/or placing down procedure.

It is useful here that the boom system does not have to be moved into predefined geometrical positions since the apparatus for assisting or fully automatically carrying out an erection and/or placing down procedure makes use of calculation values of the tilting moment detection unit and lifts the boom system from the ground as soon as this is possible on the part of the tilting torque detection unit.

The disclosure further relates to a method of assisting or fully automatically carrying out an erection and/or placing down procedure of a boom system of a lifting device comprising a main boom and a luffing boom, such as of a lifting device in accordance with one of the preceding variants discussed, wherein, in the method, steps for the erection and/or placing down of the boom system are carried out in dependence on a tilting moment detected by a tilting moment detection unit of the lifting device.

As already explained in connection with the lifting device in accordance with the disclosure, it is no longer necessary to reach predefined angle positions for one or both of the booms to be able to carry out a subsequent step in the erection and/or placing down of the boom system. The existing tilting moment that acts on the lifting device is rather now considered so that a carrying out of the subsequent step can already occur before a reaching of the previously required angle positions for one or both of the booms.

The method in accordance with the disclosure can furthermore be modified in that, on an erection of the boom system from a position placed on the ground, the main boom is traveled in the lifting direction and the luffing boom is simultaneously traveled with respect to the main boom in the lowering direction so that a lifting of a connection region of the main boom and the luffing boom occurs and, as soon as the tilting moment detected by the tilting moment detection unit is sufficiently low, the luffing boom is traveled in the lifting direction, such as already when the main boom has not yet reached its maximum erected position, where the luffing boom may already be travelling in the lifting direction when the main boom has not yet reached its maximum erected position.

Time can be saved on the erection and/or placing down of the boom system due to the simultaneous pivoting of the main boom and the changing of the angle position of the luffing boom with respect to the main boom so that the setup time of the lifting device that is erected or placed down by the present method is considerably reduced.

Provision can be made in accordance with an optional modification of the method in accordance with the disclosure that on a placing down of the boom system from an erected position, the luffing boom is traveled with respect to the main boom in the lowering direction, with, provided that the tilting moment detected by the tilting moment detection unit exceeds a threshold value, the main boom first being traveled in the lifting direction and, as soon as the travel of the luffing boom with respect to the main boom in the lowering direction has the result that the luffing boom has passed through the horizontal, the luffing boom being traveled with respect to the main boom in the lowering direction simultaneously with the main boom in the lowering direction, provided that the tilting moment detected by the tilting moment detection unit has not exceeded a threshold value, with the luffing boom being traveled with respect to the main boom in the lowering direction, for example, for so long until the luffing boom tip has ground contact or has pivoted inwardly by a maximum with respect to the main boom.

The time required for the erection and/or the placing down can also hereby be reduced so that a further acceleration is possible in the assembly or disassembly of the lifting device.

Provision can be made in accordance with a further development of the disclosure that on a placing down procedure from an erected position, the luffing boom is already traveled in the lowered direction when the main boom has not yet reached its maximum erected position.

Provision can furthermore be made by the disclosure that the traveling of the main boom and luffing boom during the carrying out of the steps for the erection and/or placing down of the boom system is only carried out in dependence on a tilting moment detected by a tilting moment detection unit of the lifting device and that no focus is placed on angle regions of the main boom and/or luffing boom that have to be rigidly reached.

This has the result that, for example, on an erection and/or placement, the luffing boom can be moved a lot earlier with respect to the main boom so that the lifting device is continuously operated more closely to a limit region of the permitted tilting moment, which enables an improved or accelerated procedure on the assembly or disassembly.

In summary, the disclosure permits the advantages explained below on the erection and/or placing down of a boom system of a lifting device. The operation on the erection and placing down is simplified overall, but with the erection and placing down simultaneously being safe due to the active monitoring during the erection by means of the tilting moment detection unit. In addition, the manual setting of the holding cable tension of the luffing boom is dispensed with that can only be estimated by the machine operator with difficulty and that has to be monitored by a signaler. It is also possible in the erection to lift the boom system from the ground as early as possible and thus to erect it faster. It is furthermore not necessary that the boom system has to be moved in a time intensive manner during placing down and/or erection into predetermined angle positions (target positions) that typically have to be traveled to in the prior art.

BRIEF DESCRIPTION OF THE FIGURES

Further features and details of the disclosure will become clear with reference to the following description of the figures. There are shown.

DETAILED DESCRIPTION

Figure 1:
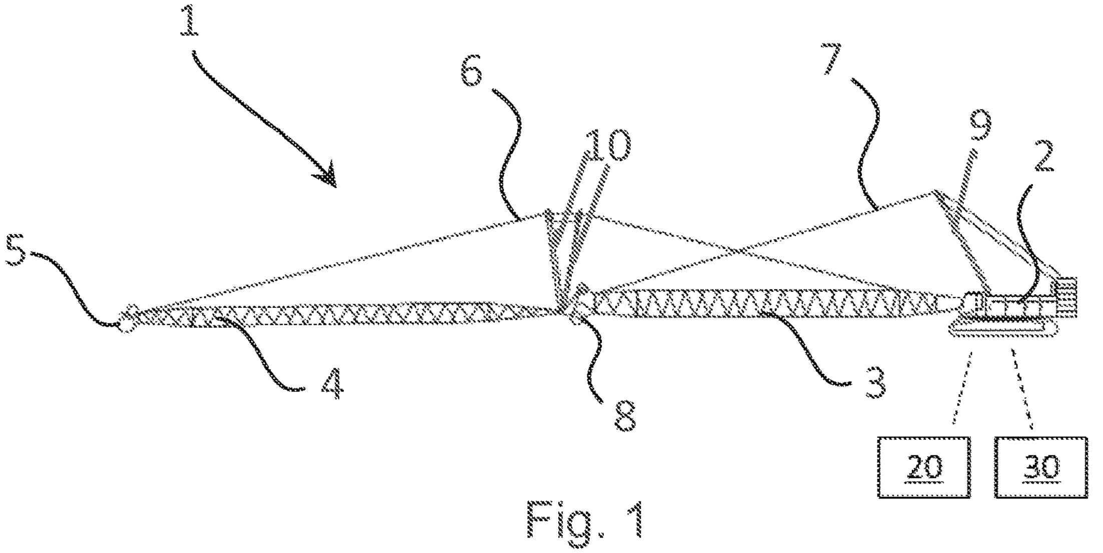
FIG. 1: a lateral representation of a lifting device with a placed down boom system.

FIG. 1 shows a lifting device 1 whose boom system 3, 4 is in a placed down position. The main boom 3 extends here starting from a superstructure 2 of a lifting device 1, for example a mobile crane. Said main boom 3 can be pivoted up and down with respect to the superstructure 2 via an adjustable erection frame 9. A winch is correspondingly controlled for this purpose so that the main boom 3 connected to the erection frame 9 via holding rods 7 is pivotable at a horizontal pivot axis with respect to the superstructure 2 by means of the pivotable erection frame 9.

A luffing boom 4 starts at the end of the main boom 3 spaced apart from the superstructure 2. Said luffing boom 4 is arranged in an articulated manner at the main boom 3 and can in this respect pivot about an axis in parallel with the pivot axis off the main boom 3 at the superstructure 2. The connection region 8 of the main boom 3 and the luffing boom 4 is here located approximately at the center of the boom system that comprises the main boom 3 and the luffing boom 4. Holding rods 6 are connected to the tip 5 of the luffing boom 4 that connect the tip of the fly boom to an A frame system comprising two A frames 10. The fly boom 4 can be pivoted with respect to the main boom 3 via the two A frames 10 that are pivotable with respect to one another via a rope system.

Figure 2:
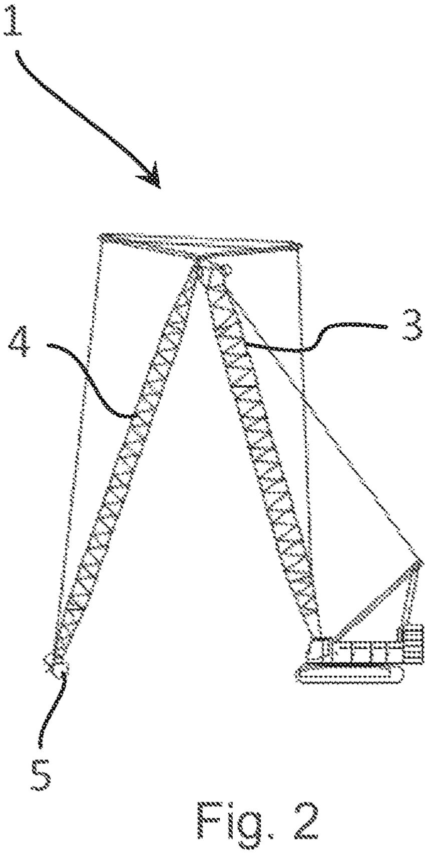
FIG. 2: a lateral representation of a lifting device whose boom system is in the erection procedure.

FIG. 2 here shows a state of a boom system 3, 4, during an assembly or disassembly in which the main boom 3 is in an erected state. The luffing boom 4, for example, can be traveled from this position by a corresponding adding of rope between the A frames 10 with respect to the main boom 3 in a lowering direction. The tip 5 of the luffing boom 4 can here roll over an apparatus along the ground surface so that the configuration shown in FIG. 2 is reached in a simple manner—from a placed down state. The person skilled in the art also calls the position shown in this Figure a switchblade position.

Figure 3:
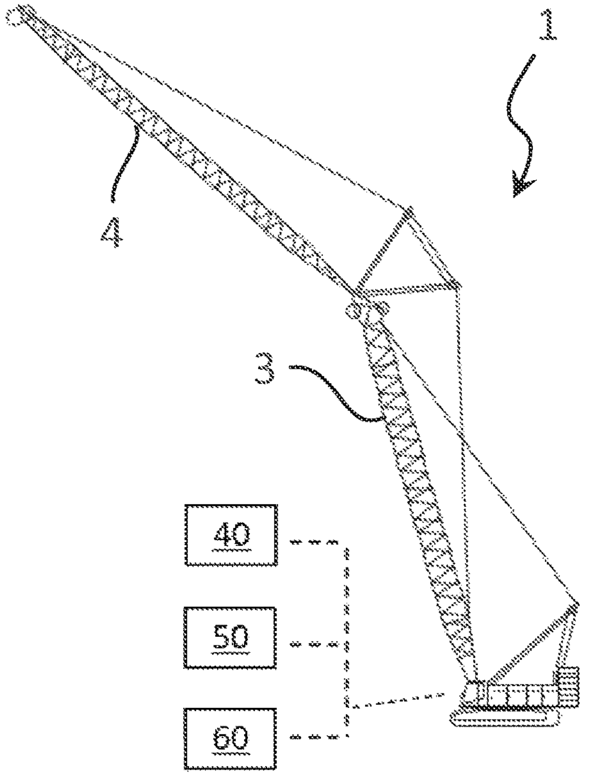
FIG. 3: a lateral representation of a lifting device with an erected boom system.

FIG. 3 now shows the lifting device 1 in its erected position, with the luffing boom 4 having been pivoted with respect to the main boom 3 in a lifting direction. In the state shown in FIG. 3, the lifting device 1 is ready for use.

The plurality of steps for erecting a lifting device provided with a boom system will be explained in the following: Provision can thus be made in accordance with the disclosure that a machine operator actuates a boom control lever (e.g., lever 60) of a user interface (e.g., user interface 50) in a first direction (e.g. lifting).

The main boom adjustment winch is controlled by the apparatus for assisting or fully automatically carrying out an erection and/or placing down procedure (e.g., the apparatus for assisting or fully automatically carrying out an erection and/or placing down procedure 40 of the boom system 3, 4) in the direction of lifting, with the speed being able to be dependent on the size of the deflection of the boom control lever for this purpose.

The luffing boom retraction mechanism is also controlled by the apparatus for assisting or fully automatically carrying out an erection and/or placing down procedure (e.g., the apparatus for assisting or fully automatically carrying out an erection and/or placing down procedure 40 of the boom system 3, 4) in the direction of lowering, with the control speed being dependent on the holding cable force of the luffing boom. The holding cable has, on the one hand, to be held sufficiently under tension so that the rope of the luffing boom adjustment winch (e.g., luffing boom winch 30) winds up correctly, but, on the other hand, the tension may not be too high since the machine could start to tilt.

As soon as the values reported by the tilting moment unit (e.g., the tilting moment detection unit 20) permit, that is sufficient security against tilting is present, the luffing boom adjustment winch is stopped by the apparatus for assisting or fully automatically carrying out an erection and/or placing down procedure, whereby the holding cable of the luffing boom is tensioned for so long by the still present control of the main boom adjustment winch in the direction of lifting until the luffing boom head is raised from the ground.

The main boom adjustment winch continues to be controlled in the direction of lifting until it reaches its steepest position for the erection procedure. Depending on the tilting moment of the lifting device detected by the tilting moment detection unit, the luffing boom adjustment winch is also already controlled in parallel with the main boom adjustment winch in the direction of lifting before the main boom has reached its steepest position which brings about a substantial time advantage.

The placing down procedure of the boom system from the erected position takes place as explained in the following. The machine operator can act on the user interface in accordance with the present disclosure; can, for example, actuate a control lever in a second direction (e.g. in the direction of lowering) that may be opposite the first direction.

The luffing boom adjustment winch is controlled by the apparatus for assisting or fully automatically carrying out an erection and/or placing down procedure in the direction of lowering, with the speed being able to be dependent on the amount of the deflection of the boom control lever for this purpose. It is, however, also conceivable that the speed is independently selected by the apparatus.

The control of the main boom adjustment winch also takes place by the apparatus for assisting or fully automatically carrying out an erection and/or placing down procedure and depends on the values of the tilting moment detected by the titling moment detection unit. If a limit value Is approached here that may not be exceeded and that presumably results in a tilting of the lifting device, the main boom adjustment winch is first controlled in the direction of lifting to move the main boom into a steeper position that is thus secure against tilting before the luffing boom can be controlled by lowering the luffing boom adjustment winch through the zero degree position (=luffing boom is horizontal).

As soon as the luffing boom has a negative angle and values of the tilting moment detected by the tilting moment detection unit permit, the main boom adjustment winch is controlled in the direction of lowering in addition to the luffing boom adjustment winch.

The luffing boom adjustment winch is controlled in the direction of lowering for so long until it is either on the ground or has reached its smallest angle relative to the main boom.

As soon as the luffing boom head is on the ground, the main boom adjustment winch continues to be controlled in the direction of lowering by the apparatus for assisting or fully automatically carrying out an erection and/or placing down procedure and the luffing boom adjustment winch is controlled in the direction of lifting to hold the holding cable of the luffing boom tensioned and to wind the rope of the luffing boom adjustment winch correctly.

If the main boom head also hits the ground, the machine operator can stop the placing down procedure in that he moves the boom control lever into the zero position. It is also covered by the disclosure that the state of a hitting the ground of the main boom is automatically recognized, for example in that the cable force of the main boom reduces, which indicates a placing down of the main boom on the ground.

Provision can accordingly also be made that the procedure of an erection or of a placing down of the boom system is carried out fully automatically, with only a release having to be actuated by an operator to trigger the procedure. Provision can furthermore be made that the fully automatic carrying out is only carried out when the operator in the meantime continuously presses a button or holds a lever in the corresponding position so that on a release of the lever or of the button, the automatic travel of the boom system is interrupted so that the operator can still react to any hazard situations that arise. The apparatuses described above may be referred to a controllers or control units, having instructions stored therein for carrying out the operations as described herein, including receiving sensor readings and sending actuation signals to actuators, such as hydraulic actuators of the crane.

FIGS. 1-3 are drawn to scale, although other relative dimensions may be used if desired. Further, FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, the term “approximately” is construed to mean plus or minus five percent of the range unless otherwise specified.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lifting device comprising:

a superstructure;

a main boom that starts from the superstructure;

a luffing boom that starts from an end of the main boom remote from the superstructure;

a winch arrangement at the superstructure and/or at the main boom;

a tilting moment detection unit comprising a control unit having instructions stored therein for determining a tilting moment acting on the lifting device by a position of the main boom and the luffing boom; and an assisting apparatus comprising a controller having instructions stored therein for carrying out an erecting and/or placing down procedure of a boom system, the boom system comprising the main boom and the luffing boom, the erecting procedure of the boom system comprising movement of the main boom and the luffing boom away from a placed down position to an erected position where, in the placed down position, the main boom, the end of the main boom, and the luffing boom extend horizontally away from the superstructure and rest on a ground surface, and where, in the erected position, the end of the main boom and the luffing boom extend vertically above and do not rest on the ground surface, and the placing down procedure of the boom system comprising movement of the main boom and the luffing boom from the erected position to the placed down position, wherein the assisting apparatus is an apparatus for assisting or for fully automatically carrying out an erecting and/or placing down procedure of the boom system comprising the main boom and the luffing boom that is configured to carry out steps for the erecting and/or placing down procedure of the boom system in dependence on the tilting moment detected by the tilting moment detection unit.

2. The lifting device in accordance with claim 1, wherein the apparatus for assisting or for fully automatically carrying out the erecting and/or placing down procedure is furthermore configured only to carry out the steps for the erecting and/or placing down procedure of the boom system in dependence on the tilting moment detected by the tilting moment detection unit so that rigid boom positions do not have to be reached in the sequence of steps for the erecting and/or placing down procedure of the boom system.

3. The lifting device in accordance with claim 1, wherein the apparatus for assisting or for fully automatically carrying out the erecting and/or placing down procedure is furthermore configured:

a) to already control the luffing boom in a lifting direction on an erection procedure when the main boom has not yet reached its maximum erected position; and/or b) to already control the luffing boom in a lowering direction on a placing down procedure when the main boom has not yet reached its maximum erected position.

4. The lifting device in accordance with claim 3, wherein the apparatus for assisting or for fully automatically carrying out the erecting and/or placing down procedure is furthermore configured:

a) to pivot the luffing boom with respect to the main boom in the lifting direction simultaneously with a lifting of the main boom on an erection procedure; and/or b) to pivot the luffing boom with respect to the main boom in a lowering direction on a placing down procedure simultaneously with a lifting of the main boom; and/or c) to pivot the luffing boom with respect to the main boom in a lowering direction on a placing down procedure simultaneously with a lowering of the main boom.

5. The lifting device in accordance with claim 4, wherein the erecting procedure is used for lifting a luffing boom tip from the ground.

6. The lifting device in accordance with claim 3, wherein the apparatus for assisting or for fully automatically carrying out the erecting and/or placing down procedure is furthermore configured to control a luffing boom winch to lower and lift the luffing boom during the erecting and/or placing down procedure, in a state in which the luffing boom has ground contact, such that a holding cable to the luffing boom exceeds a predetermined first tension value to enable a correct winding up on the luffing boom winch.

7. The lifting device in accordance with claim 6, wherein the apparatus for assisting of for fully automatically carrying out the erecting and/or placing down procedure is configured to control the luffing boom winch to lower and lift the luffing boom during the erecting and/or placing down procedure, in a state in which the luffing boom has ground contact, such that the holding cable to the luffing boom does not exceed a predetermined second tension value to prevent a tilting of the lifting device.

8. The lifting device in accordance with claim 6, wherein the steps for erecting the boom system from a position placed on the ground comprise:

controlling the main boom in the lifting direction and simultaneously controlling the luffing boom with respect to the main boom in the lowering direction so that a lifting of a connection region of the main boom and the luffing boom occurs.

9. The lifting device in accordance with claim 8, wherein the steps for erecting the boom system from an erected position comprise:

controlling the luffing boom with respect to the main boom in the lowering direction, with, as soon as the tilting moment detected by the tilting moment detection unit exceeds a threshold value, a control of the main boom in the lifting direction first taking place;

as soon as the control of the luffing boom with respect to the main boom in the lowering direction has a result that the luffing boom has passed through the horizontal, controlling the luffing boom with respect to the main boom in the lowering direction simultaneously with a control of the main boom in the lowering direction, provided that the tilting moment detected by the tilting moment detection unit does not exceed a threshold value.

10. The lifting device in accordance with claim 9, wherein, after the control of the luffing boom with respect to the main boom in the lowering direction for so long until a luffing boom tip has ground contact or has pivoted inwardly with respect to the main boom, the steps for placing down the boom system from an erected position further comprising:

controlling the main boom in the lowering direction and simultaneously controlling the luffing boom with respect to the main boom in the lifting direction so that a lowering of the connection region of the main boom and the luffing boom occurs; with the control of the main boom in the lowering direction and simultaneous control of the luffing boom with respect to the main boom in the lifting direction taking place for so long until the main boom has ground contact.

11. The lifting device in accordance with claim 9, wherein the control of the luffing boom with respect to the main boom in the lowering direction taking place until a luffing boom tip has ground contact or has pivoted inwardly by a maximum with respect to the main boom.

12. A method of assisting or fully automatically carrying out the erecting and/or placing down procedure of the boom system of the lifting device in accordance with claim 8, wherein in said method:

steps are carried out for the erecting and/or placing down of the boom system in dependence on the tilting movement detected by the tilting moment detection unit of the lifting device.

13. The method in accordance with claim 12, wherein, on an erection of the boom system from a position placed on the ground:

the main boom is traveled in the lifting direction and simultaneously the luffing boom is traveled with respect to the main boom in the lowering direction so that a lifting of the connection region of the main boom and the luffing boom occurs; and as soon as the tilting moment detected by the tilting moment detection unit is sufficiently low, the luffing boom is traveled in the lifting direction.

14. The method in accordance with claim 13, wherein, on a placing down of the boom system from an erected position:

the luffing boom is traveled with respect to the main boom in the lowering direction, with, provided that the tilting moment detected by the tilting moment detection unit exceeds a threshold value, the main boom first being traveled in the lifting direction; and as soon as travel of the luffing boom with respect to the main boom in the lowering direction has a result that the luffing boom has passed through the horizontal, the luffing boom is traveled with respect to the main boom in the lowering direction simultaneously with the main boom in the lowering direction, provided that the tilting moment detected by the tilting moment detection unit does not exceed a threshold value.

15. The method in accordance with claim 14, wherein, on a placing down procedure from an erected position, the luffing boom is already traveled in the lowered direction when the main boom has not yet reached its maximum erected position, and wherein the luffing boom travels with respect to the main boom in the lowering direction for so long until a luffing boom tip has ground contact or has pivoted inwardly by a maximum with respect to the main boom.

16. The method in accordance with claim 12, wherein traveling of the main boom and luffing boom during the carrying out of the steps for the erecting and/or placing down of the boom system is only carried out in dependence on the tilting moment detected by the tilting moment detection unit of the lifting device and no focus is placed on angle regions of the main boom or luffing boom that have to be rigidly reached.

17. The lifting device in accordance with claim 8, wherein as soon as the tilting moment detected by the tilting moment detection unit is sufficiently low controlling the luffing boom in the lifting direction, already when the main boom has not yet reached its maximum erected position.

18. The lifting device in accordance with claim 3, wherein the control of the luffing boom in the lifting direction or in the lowering direction is able to take place in that the luffing boom is held in a fixed position with respect to the main boom and movement of the luffing boom takes place by a lifting or lowering of the main boom.

19. The lifting device in accordance with claim 1, further having a user interface for actuating the apparatus for assisting or fully automatically carrying out the erecting and/or placing down procedure.

20. The lifting device in accordance with claim 19, wherein the user interface has a lever whose deflection influences a speed of the steps to be carried out, with a non-deflection of the lever resulting in a stopping of the steps to be carried out.

21. A lifting device comprising:

a superstructure;

a main boom that starts from the superstructure;

a luffing boom that starts from an end of the main boom remote from the superstructure;

a winch arrangement at the superstructure and/or at the main boom; and a tilting moment detection unit comprising a control unit having instructions stored therein for determining a tilting moment acting on the lifting device by a position of the main boom and the luffing boom; and an apparatus for assisting or for fully automatically carrying out an erecting and/or placing down procedure comprising a controller having instructions stored therein for carrying out an erecting and/or placing down procedure of a boom system, the boom system comprising the main boom and the luffing boom, the erecting procedure of the boom system comprising movement of the main boom and the luffing boom away from a placed down position to an erected position where, in the placed down position, the main boom, the end of the main boom, and the luffing boom extend horizontally away from the superstructure and rest on a ground surface, and where, in the erected position, the end of the main boom and the luffing boom extend vertically above and do not rest on the ground surface, and the placing down procedure of the boom system comprising movement of the main boom and the luffing boom from the erected position to the placed down position, wherein the apparatus for assisting or for fully automatically carrying out an erecting and/or placing down procedure is configured to carry out steps for the erecting and/or placing down procedure of the boom system in dependence on the tilting moment detected by the tilting moment detection unit, and the apparatus for assisting or for fully automatically carrying out the erecting and/or placing down procedure is furthermore configured only to carry out the steps for the erecting and/or placing down procedure of the boom system in dependence on the tilting moment detected by the tilting moment detection unit so that rigid boom positions do not have to be reached in the sequence of steps for the erecting and/or placing down procedure of the boom system.

* * * * *